United States Patent [19]

Pawloski

[11] Patent Number: 5,255,382
[45] Date of Patent: Oct. 19, 1993

[54] PROGRAM MEMORY EXPANDER FOR 8051-BASED MICROCONTROLLED SYSTEM

[76] Inventor: Martin B. Pawloski, 13718 E. Galveston St., Gilbert, Ariz. 85234

[21] Appl. No.: 587,244

[22] Filed: Sep. 24, 1990

[51] Int. Cl.⁵ .................. G06F 12/00; G06F 13/00
[52] U.S. Cl. ................................... 395/425; 395/400; 395/375; 364/230.5; 364/255.1; 364/258.1; 364/258.4; 364/261.3; 364/261.9; 364/DIG. 1
[58] Field of Search ............... 395/425, 400; 364/200 MS File, 900 MS File

[56] References Cited

U.S. PATENT DOCUMENTS

| | | | |
|---|---|---|---|
| 3,735,355 | 5/1973 | Balogh, Jr. et al. | 395/425 |
| 3,818,460 | 6/1974 | Beard et al. | 364/200 |
| 4,037,211 | 7/1977 | Ikuta et al. | 395/400 |
| 4,296,468 | 10/1981 | Bandoh et al. | 395/400 |
| 4,307,448 | 12/1981 | Sattler | 364/200 |
| 4,346,441 | 8/1982 | Plank et al. | 364/200 |
| 4,368,515 | 1/1983 | Nielsen | 364/200 |
| 4,388,685 | 6/1983 | Kotok et al. | 395/400 |
| 4,443,864 | 4/1984 | McElroy | 364/900 |
| 4,445,170 | 4/1984 | Hughes et al. | 364/200 |
| 4,471,458 | 9/1984 | Weilbacker et al. | 364/900 |
| 4,475,176 | 10/1984 | Ishii | 364/900 |
| 4,485,457 | 11/1984 | Balaska et al. | 364/900 |
| 4,503,491 | 3/1985 | Lushtak et al. | 364/200 |
| 4,698,749 | 10/1987 | Bhadriraju | 364/200 |
| 4,744,025 | 5/1988 | Lipcon et al. | 364/200 |
| 4,761,736 | 8/1988 | Di Orio | 364/200 |
| 4,805,092 | 2/1989 | Cerutti | 364/200 |
| 4,831,522 | 5/1989 | Henderson et al. | 364/200 |
| 4,969,086 | 11/1990 | Pfeiffer et al. | 364/200 |

FOREIGN PATENT DOCUMENTS 59-208662  7/1984  Japan.
63-311547  6/1988  Japan.

Primary Examiner—Joseph L. Dixon
Assistant Examiner—Frank J. Asta
Attorney, Agent, or Firm—Cahill, Sutton & Thomas

[57] ABSTRACT

An 8051-based microcontroller system includes an 8051 microcontroller chip which is capable of directly addressing only 64k addresses, and which is capable of addressing two kilobyte pages using a three bit embedded address portion of instruction op codes, and also includes a program memory having substantially more than 64k locations and a program memory expander including circuitry for transferring the three bits of the embedded address into an extended address register in response to detection of an AJMP or ACALL instruction from the program memory and forcing predetermined states on a multiplexed address/data bus to prevent the 8051 microcontroller chip from recognizing the AJMP or ACALL instruction. The program memory expander also includes circuitry for incrementing or decrementing the contents of the extended address register in coordination with incrementing or decrementing of an extended address including a portion in a program counter of the 8051 microcontroller chip and a portion in the extended address register, and circuitry for applying the extended address register to address inputs of the program memory.

17 Claims, 4 Drawing Sheets

ND MICROCONTROLLED SYSTEM

PROGRAM MEMORY EXPANDER FOR 8051-BASED MICROCONTROLLED SYSTEM

BACKGROUND OF THE INVENTION

The invention relates to a system for expanding the program memory capability of an 8051-based microcontroller (manufactured by Intel and others) from its standard 65,536 bytes (i.e., 64 kilobytes) to 524,288 bytes (i.e., 512 kilobytes) without the need for either segment registers or memory bank registers.

The 8051 is a microcontroller that is commonly used in "embedded control" applications. (Hereinafter, the term "8051" includes any "ROMless" mode microcontroller that executes the well-known 8051 instruction set.) As the complexity of these applications continues to grow, the size of the associated program increases commensurately. Also, programmers are increasing their use of High Level languages (e.g., the languages C and PL/M-51) in programming 8051-based applications. A program written in a High Level language generally uses considerably more program memory than the same program written in Assembly language. As a result of the above two trends, it is not unusual for 8051-based systems to require significantly more than 64 kilobytes of program memory.

The 8051 was designed with a 16-bit Program Counter, which limits the size of its program memory to 64 kilobytes. While some microprocessors have embedded therein segment registers to extend the size of their program memory, the 8051 makes no such provisions. 8051 programs larger than 64 kilobytes can only be accommodated by using what is commonly called "memory bank switching" techniques. Memory bank switching uses a dedicated register completely independent of the 8051 program counter to extend the number of program memory address bits. Memory bank switching requires the programmer to break down his program into sections that can fit completely within a bank of 64 kilobytes. The programmer also has to ensure that the bank register is loaded properly as the program transitions from one 64 kilobyte bank to another.

While the memory bank switching technique is simple in concept and offers the potential of supporting a large program memory size, it suffers from many severe deficiencies. Some of the major deficiencies are itemized below:

(1) Since the instruction for loading of the memory bank register is a separate operation from a program jump instruction, either the program must be fine tuned to take into account the sudden transition to another memory bank or else costly external hardware must be provided to synchronize the loading of the new memory bank to the instruction stream.

(2) In order to execute a subroutine call to another bank, the programmer has to be very careful that the current memory bank value is saved on the call, that the hardware synchronizes the loading of the new memory bank to the instruction stream, that the previous memory bank value is restored on return, and again that the memory bank value is synchronized to the instruction stream.

(3) The program must be designed to make special provision for handling interrupts since interrupts are an integral part of the 8051 device and are therefore completely independent of any memory bank switching algorithm the programmer may be using.

(4) At each 64 kilobyte boundary there is a forbidden zone that cannot be used. This forbidden zone prevents instructions from straddling two 64 kilobyte memory banks, as well as preventing relative jumps from executing either forward or backward offsets across a 64 kilobyte boundary.

(5) Since there is no standard method of implementing memory bank switching, every programmer is free to use any number of methods. As a result, it is difficult to find development tools that support memory bank switching methods, thus increasing the difficulty in debugging the application and complicating the design effort.

In summary, due to the special processing and handling required, use of memory bank switching in an 8051-based application typically slows down the program execution, increases hardware costs and increases the cost of software being developed.

There is a need to be able to expand the program memory for the 8051 microcontroller from 64 kilobytes to 512 kilobytes while eliminating the problems associated with memory bank switching.

SUMMARY OF THE INVENTION

It is an object of the invention to provide an 8051-based microcontroller system with the capability of addressing more than 64 kilobytes of program memory without concern for whether 64 kilobyte boundaries are being crossed.

It is another object of the invention to provide a technique and apparatus for enabling an 8051-based microcontroller system to access as much as 512 kilobytes of program memory.

It is another object of the invention to provide a technique for conveniently expanding the size of the program memory of an 8051-based microcontroller system beyond 64 kilobytes.

It is another object of the invention to avoid the problems of known memory bank switching techniques to address more program memory space than is directly addressable by a microcontroller.

Briefly described, and in accordance with one embodiment thereof, the invention provides an 8051-based microcontroller system with its 16 bit program counter capable of directly addressing only 64 kilobytes of program memory, and which can execute a class of instructions that permit program jumps (AJMP instructions) and subroutine calls (ACALL instructions) anywhere within a 2,048 byte (two kilobyte) page using an 11 bit absolute address with the three most significant bits of the 11 bit address residing in the op code byte of the instruction, and which includes a program memory including circuitry for transferring the three bits of the address from the op code byte into an extended address register in response to detection of this class of instruction being fetched from the program memory. The program memory expander also includes a circuit for incrementing or decrementing the contents of the extended address register in conjunction with the program flow as it executes across a 64 kilobyte boundary. The extended address register is coupled to address inputs of the program memory.

BRIEF DESCRIPTION OF THE DRAWINGS

FIG. 1A shows the format of a standard AJMP instruction.

DETAILED DESCRIPTION OF THE PREFERRED EMBODIMENT

Figure 1:
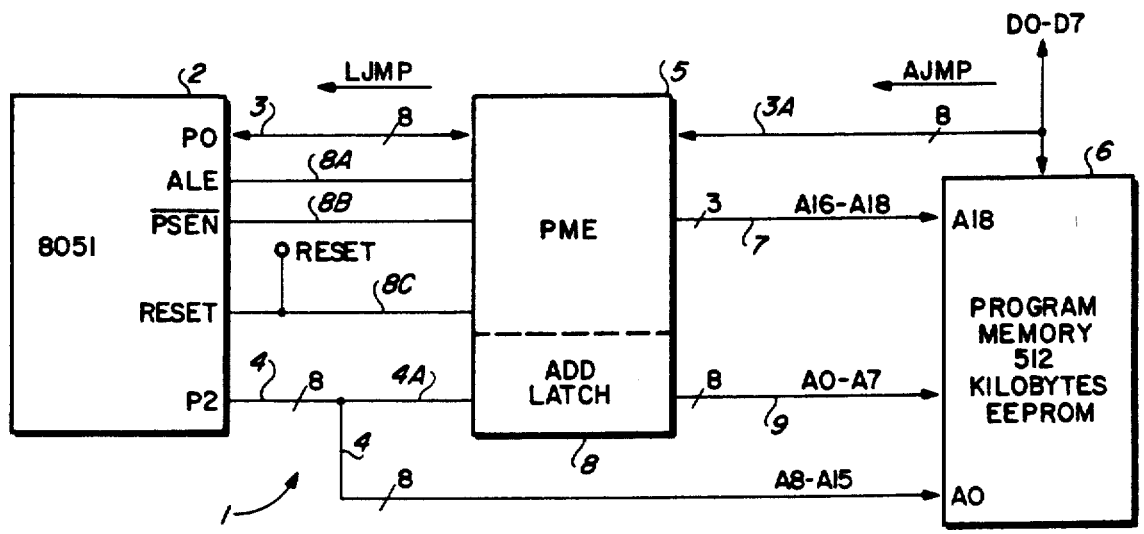
FIG. 1 is a block diagram showing connection of the program memory expander of the present invention to an 8051-based microcontroller system.

The present invention provides an integrated circuit chip called a program memory expander (PME), that is connected between an 8051 microcontroller chip and a 512 kilobyte memory (ROM, EPROM, RAM, etc.) in which the program memory is stored.

The 512 kilobyte program memory addressing capability provided by the PME is completely linear with no discontinuities or 64 kilobyte boundaries that have to be accommodated by the program. To achieve this, the 64 kilobyte addressability that results from the 16-bit address bus of the 8051 using its 16-bit program counter must be replaced with a 19-bit address bus that operates with a 19-bit "virtual program counter". With 19-bit program memory addresses, the program memory space becomes a 512 kilobyte memory space in which the programmer does not have to be concerned with any of the above-mentioned 64 kilobyte boundary constraints. The 19-bit program memory address is created by concatenating a 3-bit PME extended address register (XAR) with the 16-bit 8051 program counter. The XAR bits are high order bits that form "extended" address bits A16, A17, and A18.

To use this 19-bit virtual program counter to address a linear 512 kilobyte program memory, the 19-bit virtual program counter must operate in such a way that all of the following conditions are met:

(1) The 19-bit virtual program counter must be directly loadable so that the 8051 program can jump to any location or call a subroutine at any location in the 512 kilobyte program memory space from any location in the 512 kilobyte program memory space.

(2) The 19-bit virtual program counter must be stacked on subroutine calls and restored on returns from subroutines.

(3) During interrupt vectoring, the 19-bit virtual program counter must be stacked and then loaded with the correct interrupt vector. Also the 19-bit virtual program counter must be restored on a return from interrupt.

(4) All loads of the 19-bit virtual program counter must be synchronized to the instruction stream so that the new value is loaded at the beginning of an instruction cycle.

(5) Any byte of any instruction can straddle any 64 kilobyte boundary in the 512 kilobyte program memory without affecting the execution of the instruction.

(6) Any and all relative jump instructions can be executed with both forward and backward jumps across any 64 kilobyte boundary in the 512 kilobyte program memory.

To achieve all the above requirements, the PME provides a new combination of elements and techniques. More specifically, the PME primarily includes an 8051 instruction sequencer and decoder, the above-mentioned three-bit extended address register (XAR) that provides the most significant three-bits of the 19-bit virtual program counter, an incrementer and decrementer circuit that operates on the XAR, a 64 location by 3-bit stack, an interrupt active decode circuit, a translation circuit that detects AJMP and ACALL op codes input from program memory and outputs LJMP and LCALL op codes to the 8051, an 8-bit address latch, various input and output buffers, and synchronization circuits.

Referring to FIG. 1, the complete microcontroller system 1 has PME chip 5 coupled between the 8051 microcontroller chip 2 and 512 kilobyte program memory 6. 8051 microcontroller chip 2 has its eight input/output port conductors P0 connected to an 8-bit multiplexed address/data bus 3 and its eight input/output port conductors P2 connected to an 8-bit address bus 4. The addresses A8–A15 on conductors 4 are connected to address inputs A8–A15 of program memory 6.

The eight address/data bus conductors 3 are connected to input/output conductors of PME chip 5 of the present invention, which generates the three above-mentioned expanded address outputs A16–A18 on conductors 7 and applies them to the A16–A18 address inputs of program memory 6. PME chip 5 also latches the address available on the address/data bus 3 during the address phase of an 8051 program memory bus cycle and outputs these eight addresses A0–A7 on conductors 9 that are connected to the A0–A7 address inputs of program memory 6. PME chip 5 also has eight input/output conductors that are connected to 8-bit data bus 3A, which are connected to the eight data outputs D0–D7 of program memory 6.

Additionally, the control signal ALE on conductor 8A is output by 8051 microcontroller 2 and specifies the address phase of an 8051 program memory bus cycle, at which time the low byte of the address is output by 8051 microcontroller 2 and appears on address/data bus 3. The signal ALE on conductor 8A is input to PME chip 5, which uses it to latch the low byte of the address and outputs it on address bus 9. 8051 microcontroller 2 also outputs the control signal PSEN on conductor 8B to specify the data read phase of the program memory bus cycle. The signal PSEN on conductor 8B is input by PME 5 as well as program memory 6 and causes program memory 6 to output data on data bus 3A. PME 5 receives this data, buffers it, conditionally translates it and outputs it on address/data bus 3. This data is then received by 8051 microcontroller 2.

The control signal RESET on conductor 8C is applied as an input to both 8051 microcontroller 2 and PME 5. RESET is a system signal that is used to initialize the various chips and start the program executing from program memory location 0.

The most significant bit of the 16-bit address, A15, is output by the 8051 microcontroller 2. This signal on conductor 4A is connected to PME 5, which inputs it and uses it to determine both underflow and overflow conditions of the 8051 16-bit program counter.

The 8051 instruction set includes one-byte, two-byte and three-byte instructions. The first byte of all instructions is the op code byte, with the remaining bytes, if any, providing operand, offset or address information. As data is read from program memory 6 and input to the 8051 microcontroller 2, it also is loaded and decoded by the PME sequencer. This sequencer allows the PME to keep track of which "data reads" are op code fetches and allows it to synchronize the output of new extended addresses to the beginning of instruction cycles.

The 8051 instruction set includes two types of direct jump instructions. One type is called the Long Jump instruction, which has the mnemonic LJMP. The LJMP instruction is a three byte instruction with the first byte being the op code byte. The second byte is the high byte of the target address, and the third byte is the low byte of the target address. The LJMP instruction provides a 16-bit target address. During execution of LJMP, 8051 microcontroller 2 replaces the contents of its 16-bit program counter with second and third bytes of the LJMP instruction. This results in the LJMP instruction allowing the program to jump anywhere in the 64 kilobyte program memory.

The other type of direct jump instruction of the 8051 instruction set is the Absolute Jump, the mnemonic of which is AJMP. The AJMP instruction is a two byte instruction with the first byte being the op code byte and the second byte being the lower byte of the target address. An unusual aspect of the AJMP instruction is that 3 bits of the target address are embedded in the op code byte. Therefore, the AJMP instruction provides an 11-bit (3 from first byte and 8 from second byte) target address. During execution of AJMP, 8051 microcontroller 2 replaces the 11 least significant bits of its program counter with the 11-bit target address from the AJMP instruction. This results in the AJMP instruction allowing the program to jump anywhere in a 2 kilobyte page.

In order to provide instructions that allow the program to jump directly to any arbitrary location in the 512 kilobyte program memory 6 (see Requirement (1) above), a means is required that provides a 19-bit address that then is loaded into the 19-bit virtual program counter.

PME 5 accomplishes this by combining the three bits of embedded address information in the AJMP op code with the 16-bits of address contained in the LJMP instruction. This hybrid construct is called a Far Jump instruction with the mnemonic FJMP. When used in a program, the software translator (e.g., assembler, compiler) takes the 19-bit target address specified by the programmer, puts the 3 most significant bits in an AJMP op code, puts the next most significant 8-bits as the second byte of the instruction, and uses the least significant 8-bits as the third byte. Thus, the FJMP instruction appears in program memory 6 as the 3-byte AJMP instruction.

Since this is not a valid 8051 instruction, PME 5 needs to translate this instruction for the 8051. When the first byte of the FJMP instruction is read from program memory 6, PME 5 detects that it is an AJMP op code and takes three actions. First, it takes the three embedded address bits from the AJMP op code byte and loads them into a holding register. Second, it outputs an LJMP op code to the 8051. 8051 microcontroller 2, upon reading and executing the LJMP op code, reads the remaining two bytes of the instruction and loads them into its 16-bit program counter. Finally, PME 5, upon detecting the beginning of a new instruction cycle, transfers the contents of its holding register to XAR (numeral 42 of FIG. 2) and outputs them as address bits A16-A18. These address bits form the 3 most significant bits of the desired 19 bit target addresses, while 8051 microcontroller 2 outputs the 16 least significant bits of the new 19-bit target address.

As a result of this technique, it is possible to directly jump to any address in the entire 512 kilobyte space of program memory 6.

Similarly, the 8051 instruction set includes two types of direct call instructions which allow the programmer to access subroutines. One type is called the Long Call instruction, which has the mnemonic LCALL. The LCALL instruction is a three byte instruction with the first byte being the op code byte, the second byte being the high byte of the subroutine address, and the third byte being the low byte of the subroutine address. LCALL provides a 16-bit subroutine address.

During execution of LCALL, 8051 microcontroller 2 first pushes the two bytes of its 16-bit program counter onto its hardware stack and then replaces the contents of its 16-bit program counter with second and third bytes of the LCALL instruction. This results in LCALL allowing the program to call a subroutine anywhere in the 64 kilobyte program memory.

The other type of direct call instruction is the Absolute Call instruction, the mnemonic of which is ACALL. The ACALL instruction is a two byte instruction, with the first byte being the op code byte and the second byte being the lower byte of the subroutine address. Similarly to the AJMP instruction, the ACALL instruction contains 3-bits of the subroutine address embedded in its op code byte. Therefore, ACALL instruction provides an 11-bit (3 bits from first byte and 8 bits from second byte) subroutine address. During execution of the ACALL, the 8051 first pushes the two bytes of its 16-bit program counter onto its hardware stack and then replaces the 11 least significant bits of its program counter with the 11-bit subroutine address from the ACALL instruction. This results in ACALL allowing the program to call a subroutine anywhere in a 2 kilobyte page.

In order to provide instructions that allow direct subroutine calls anywhere in the 512 kilobyte program memory (see requirements (1) and (2) above), a means is required to first, store the 19-bit virtual program counter in a hardware stack, and second, to provide a 19-bit subroutine address that then is loaded into the 19-bit virtual program counter.

PME 5 accomplishes this by providing its own "extended" hardware stack for the 3 most significant bits of the 19-bit virtual program counter that are held in its XAR. PME 5 also provides for the 19-bit subroutine address by combining the three bits of embedded address information in the ACALL op code with the 16-bits of address contained in the LCALL instruction. This hybrid construct is called a Far Call instruction, with a mnemonic of FCALL. When used in a program, a software translator (e.g., assember, compiler) takes the 19-bit target address specified by the programmer, puts the 3 most significant bits in an ACALL op code, uses the next most significant 8 bits as the second byte of the instruction, and uses the least significant 8 bits as the third byte. Thus, the FCALL instruction appears in program memory as the 3-byte ACALL.

Since this is not a valid 8051 instruction, PME 5 translates this instruction for the 8051. When the first byte of the FCALL instruction is read from program memory 6, PME 5 detects that it is an ACALL op code and takes four actions. First, it takes the three embedded address bits from the ACALL op code byte and loads them into a holding register. Second, it outputs an LCALL op code to 8051 microcontroller 2. 8051 microcontroller 2, upon reading and executing the LCALL op code, reads the remaining two bytes of the instruction and loads them into its 16-bit program counter after pushing the current contents of the program counter onto its hardware stack. Third, after the 8051 has read the remaining two bytes, PME 5 takes the contents of its XAR and pushes them on its own hardware stack. Finally, PME 5, upon detecting the beginning of a new instruction cycle, transfers the contents of its holding register to its XAR and outputs them as A16-A18. These three extended address bits form the 3 most significant bits of the 19 bit extended address and the 8051 microcontroller 2 outputs the 16 least significant bits of the new 19-bit subroutine address. As a result of this technique, it is possible to directly call a subroutine anywhere in the complete 512 kilobyte program memory space.

The programmer places a Return from subroutine instruction, whose mnemonic is RET, at the end of a subroutine. 8051 microcontroller 2 executes RET by popping two bytes off its hardware stack and places them in its 16-bit program counter. When PME 5 detects an RET instruction being read out of the 512 kilobyte program memory, it pops its own hardware stack, loads the XAR with the stack value and outputs it as A16-A18 at the beginning of the next instruction cycle.

In order to allow interrupts to vector correctly, PME 5 needs to be able to decode the fact that an interrupt is being processed. 8051 microcontroller 2 provides no specific external status indicator that an interrupt is being processed. Internally, 8051 microcontroller 2 vectors to an interrupt by ignoring the currently fetched op code and forcing an LCALL op code with the interrupt vector as the target address in the instruction stream. While this internally generated LCALL instruction is being executed, 8051 microcontroller 2 continues with dummy program memory bus cycles. Since these bus cycles are dummy cycles, a fact about them is that the 16-bit address output does not change (i.e., the 16-bit 8051 program counter does not increment since its not really reading any data). PME 5 decodes this state by comparing the least significant bit of the program memory address during an op code fetch and the subsequent read. If this address bit has the same value for both bus cycles, then 8051 microcontroller 2 must be vectoring to an interrupt. Upon detecting this condition, PME 5 pushes the current contents of its XAR onto its own hardware stack and loads the XAR with all +0's". The XAR is loaded with "0's" since all 8051 interrupt vectors reside in the first 64 kilobytes or program memory.

The programmer places a Return from Interrupt instruction, whose mnemonic is RETI, at the end of the program's interrupt handling subroutine. 8051 microcontroller 2 executes the RETI instruction by popping two bytes off its hardware stack and placing them in its 16-bit program counter. When PME 5 detects an RETI instruction being read out of program memory 6, it pops its own hardware stack, loads the XAR with the stack value and outputs it as A16-A18 at the beginning of the next instruction cycle.

In order for the program to flow smoothly over a 64 kilobyte boundary (see requirement (5) above), PME 5 must be able to detect that the 8051 16-bit program counter has overflowed and then increment the contents of the XAR. PME 5 detects this condition by monitoring the most significant bit A15 of the 16-bit program memory address output by the 8051 on conductor A15. PME 5 detects 8051 16-bit program overflow whenever A15 undergoes a transition from a "1" to a "0" between two subsequent program memory read operations, in which case PME 5 increments the contents of XAR 42 (FIG. 2) before it outputs the contents of XAR 42 as A16-A18.

All relative jumps in the 8051 instruction set have a possible range of −128 to +127 addresses relative to the address after the relative jump instruction. To allow relative jumps both forward and backward across 64 kilobyte boundaries (see Requirement (6) above), PME 5 must be able to detect both overflow and underflow of the 8051 16-bit program counter after execution of a relative jump instruction. To detect underflow, PME 5 first looks at A7 (most significant bit of the low byte of the address) to see if underflow is possible. The 8051 16-bit program counter can underflow only if the low byte of the program counter underflows Since the maximum backwards jump is 128 addresses, the low byte only can underflow if its value is less than 128 (80 in hexadecimal). Therefore, PME 5 looks at A7 of the last 8051 program memory read operation of the relative jump instruction (which actually is a dummy read of the first byte of the next instruction). If A7 is a "1", no underflow is possible and PME 5 takes no action on its XAR 42. However, if A7 is a "0", PME 5 compares the value of A15 of the last 8051 program memory read of the relative jump instruction with the value of A15 of the program memory read of the next instruction. If A15 was a "0" and is now a "1", an underflow condition exists and PME 5 decrements the contents of XAR 42 before outputting them as A16-A18.

A similar operation is performed to detect overflow on forward relative jumps. The 8051 16-bit program counter can overflow only if its low byte overflows. Since the maximum forward jump is 127 addresses, the low byte only can overflow if its value is greater than 128 (80 in hexadecimal). Therefore, PME 5 looks at A7 of the last 8051 program memory read of the relative jump instruction (which is actually a dummy read of the first byte of the next instruction). If A7 is a "0", no overflow is possible and PME 5 takes no action on its XAR 42. However, if A7 is a "1", PME 5 compares the value of A15 of the last 8051 program memory read of the relative jump instruction with the value of A15 of the program memory read of the next instruction. If A15 was a "1" and is now a "0", an overflow condition exists and PME 5 increments its XAR before they are output as A16-A18.

Figure 2:
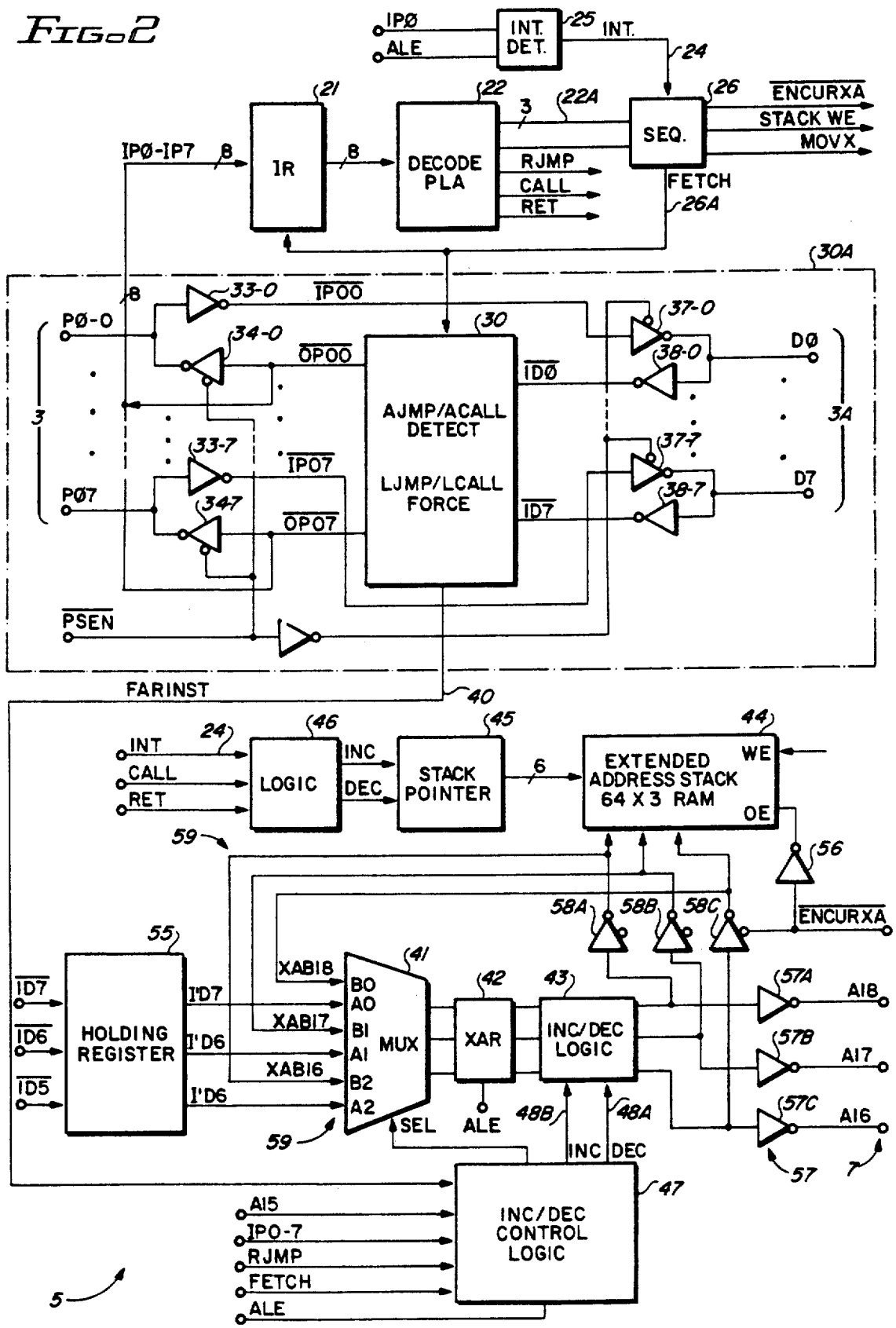
FIG. 2 is a detailed block diagram of the program memory expander portion of FIG. 1.

In FIG. 2, which is a detailed block diagram of PME 5, D0-D7 bus 3A has its D0 conductor connected to the output of inverter 37-0 and the input of inverter 38-0 which together form a transceiver 37-0,38-0. An input of inverter 37-0 is connected to the output of P buffer 33-0. The output of inverter 38-0 is connected to the $\overline{ID0}$ input of detect/force circuit 30. Data terminals D1-D7 are similarly coupled by the other inverters 38-1 through 38-7 to the $\overline{ID1}$-$\overline{ID7}$ terminals of detect/force circuit 30. The P0-0 through P0-7 conductors 3 are buffered by inverters 33-0 through 33-7 and produce the signals $\overline{IP00}$ through $\overline{IP07}$ applied to the inputs of buffers 37-09 through 37-7, respectively.

The $\overline{IP00}$ signal produced by inverter 33-0 is applied directly to the input of inverter 37-0. The outputs of the other inverters 33-1, 33-2, etc. are similarly directly connected to the inputs of inverters 37-1, 37-2, etc., respectively. Gated inverters 34-0, 34-1 ... 34-7 are gated by $\overline{PSEN}$, which is inverted to apply PSEN to gated inverters 37-0, 37-1 ... 37-7.

The IP0 through IP7 terminals are connected to the inputs of instruction register 21, the eight outputs of which are connected to inputs of decoder 22, which is implemented by a Program Logic Array (PLA) to perform the function of decoding the relative jump (RJMP), CALL, and Return from Interrupt (RET) instructions, and also to produce signals on conductors 22A that are applied to the input of a sequence circuit 26.

The IP0 and ALE signals are applied to inputs of interrupt detect circuit 25 to produce an interrupt signal on conductor 24 that is input to sequencer circuit 26. Sequencer 26 generates the signal FETCH on conductor 26A on the condition that the byte being read from program memory 6 is the first byte (op code byte) of the instruction. Conductor 26A is connected to the fetch input of AJMP/ACALL detect, LJMP/LCALL force circuit 30, which produces a FARINST ("far instruction") signal on conductor 40. Conductor 40 is connected to increment/decrement control logic circuit 47. Increment/decrement control logic circuit 47 produces a select signal applied to the channel select input of multiplexer 41. Increment/decrement control logic circuit 47 produces an decrement signal DEC on conductor 48A and applies it to increment/decrement logic circuit 43, and also produces an increment signal INC on conductor 48B and applies it to increment/decrement logic circuit 43.

A holding register 55 receives the signals $\overline{ID5}$, $\overline{ID6}$, and $\overline{ID7}$ from the outputs of buffers 38-5, 38-6, 38-7, respectively, and latches them to produce the signals ID5', ID6', and ID7', respectively, which are applied to the "A" inputs of multiplexer 41. The three outputs of multiplexer 41 are connected to inputs of above-mentioned extended address register (XAR) 42, which is clocked by ALE, and produces outputs that are applied to the inputs of increment/decrement logic circuit 43. The outputs of increment/decrement logic 43 are applied to the inputs of three inverting buffers 57, the outputs of which produce the extended address signals A16, A17, and A18 on conductors 7. The outputs of increment/decrement logic circuit 43 also are applied by inverting buffers 58A-C and extended address bus conductors 59 to three data inputs of a 64 word by 3 bit extended address stack RAM 44 via extended address bus 59. Extended address bus conductors 59 conduct extended address signals XAB16, XAB17, and XAB18 which are applied to the B2, B1, and B0 inputs of multiplexer 41.

Logic circuit 46 decodes the INT signal on conductor 24 and the CALL and RET signals generated by decoder 22 to produce the INC (increment) and DEC (decrement) signals applied to the input of a stack pointer circuit 45, the 6 outputs of which are applied to address inputs of extended address stack 44.

The circuitry within dotted line 30A of FIG. 2 includes the transceivers such as 33-0,34-0 connected to the P0 bus, the transceivers such as 37-0,38-0 connected to the D0-D7 bus, and the detect/force circuit 30. Circuitry 30 is shown in more detail in FIG. 4.

Figure 4:
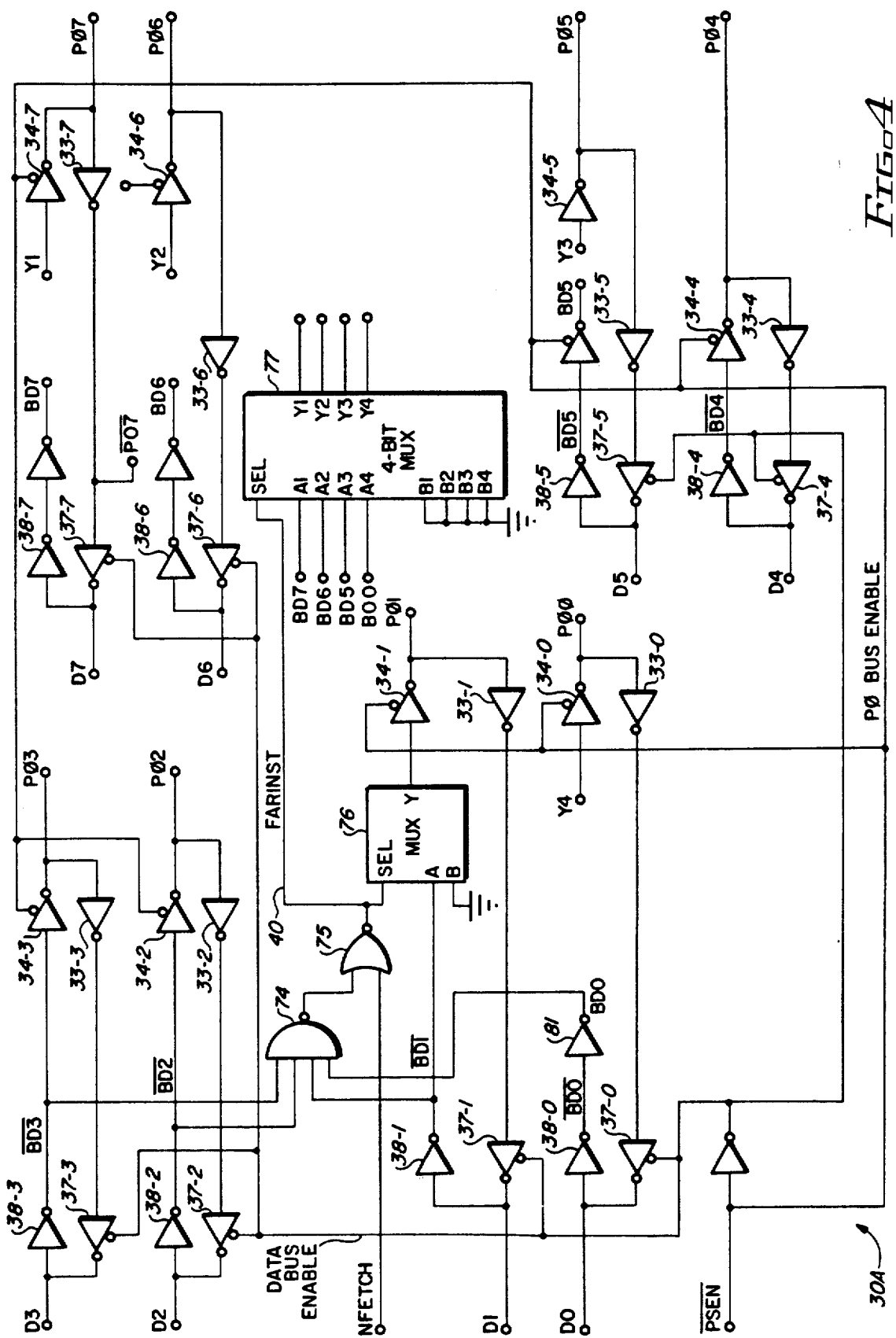
FIG. 4 is a circuit diagram of part of the circuitry in block 30 of FIG. 2.

Referring to FIG. 4, NAND gate 74 has inputs connected to the outputs of inverting input buffers 38-3, 38-2, 38-1 and 38-0. The output of NAND gate 74 is connected to one input of NOR gate 75, the other input of which is connected to receive the signal $\overline{FETCH}$. $\overline{FETCH}$ performs the function of signifying that the current byte being read is an op code byte (i.e., the first byte of an instruction). NOR gate 75 produces the signal FARINST on conductor 40, which is applied to the select inputs of multiplexers 76 and 77. The A1, A2, A3, and A4 inputs of multiplexer 77 are connected to receive the buffered data signals BD7, BD6, BD5, and BD0. The B1, B2, B3, and B4 inputs of multiplexer 77 are connected to ground. The "A" input of multiplexer 76 is connected to receive the $\overline{BD1}$ signal and its "B" input is connected to ground. The Y1, Y2, Y3, and Y4 inverting outputs of multiplexer 77 are connected as shown to the inputs of output buffers 34-7, 34-6, 34-5, and 34-0. The Y output of multiplexer 76 is connected as shown to output buffer 34-1. Gates 74 and 75, as well as multiplexers 76 and 77, effectively comprise block 30 in FIG. 2, the AJMP/ACALL detect and LJMP/LCALL force functions.

Figure 5:
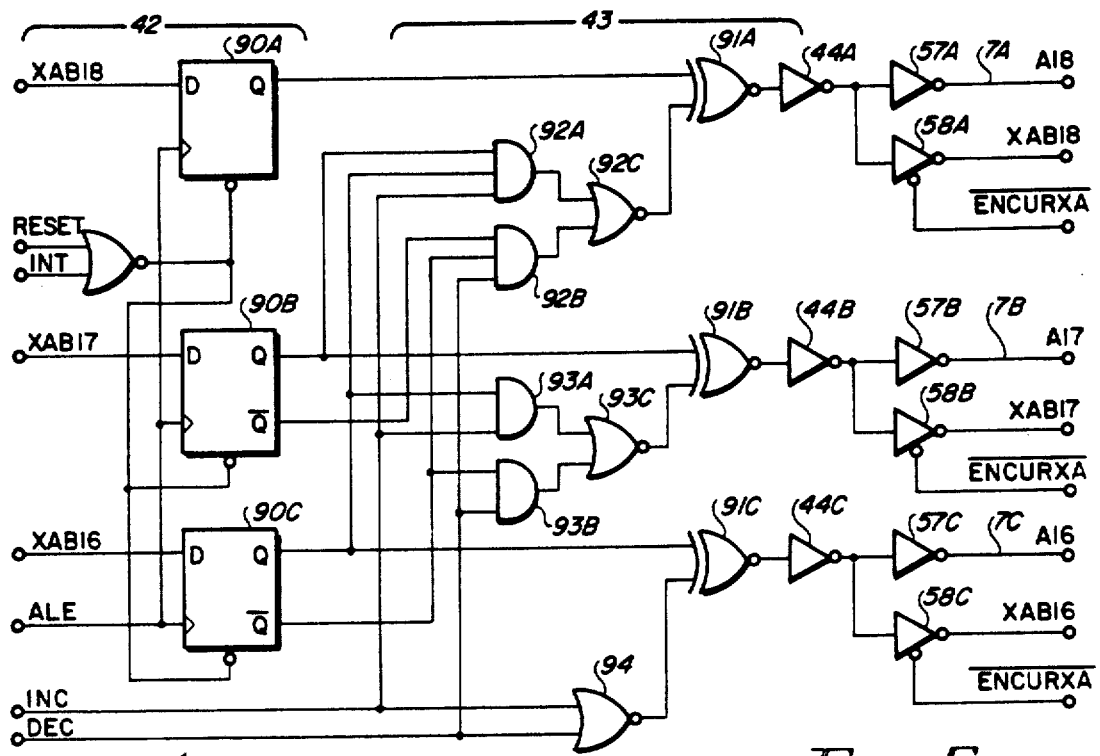
FIG. 5 is a diagram of the extended address register in block 42 and the incrementer/decrementer logic in block 43 of FIG. 2.

FIG. 5 shows an implementation of extended address register 42 and increment/decrement logic 43 of FIG. 2. Extended address register 42 includes three D type flip-flops 90A, 90B, and 90C all clocked by ALE and receiving on their D inputs the above-mentioned extended address bus signals XAB18, XAB17, and XAB16.

Increment/decrement logic 43 in FIG. 5 includes three exclusive OR gates 91A, 91B, and 91C, the outputs of which are inverted and buffered to produce the A18, A17, and A16 signals. Numerals 57A-C designate the three inverting output buffers, and numerals 7A-C designate the address outputs.

One input of exclusive NOR gate 91A is connected to the Q output of flip-flop 90A. Another input of exclusive OR gate 91A is connected to the output of NOR gate 92C, one input of which is connected to the output of a three input AND gate 92A. The other input of NOR gate 92C is connected to the output of a three input AND gate 92B. The three inputs of AND gate 92A are connected to the Q output of flip-flop 90B, the Q output of flip-flop 90C, and the INC conductor, respectively. The three inputs of gate 92B are connected to the $\overline{Q}$ output of flip-flop 90B, the Q output of flip-flop 90C, and the DEC signal, respectively.

One input of exclusive NOR gate 91B is connected to the Q output of flip-flop 90B, the other input being connected to the output of NOR gate 93C. One input of NOR gate 93C is connected to two input AND gate 93A, the other input being connected to the output of AND gate 93B. The two inputs of gate 93A are connected to the Q output of flip-flop 90C and INC signal conductor, respectively. The two inputs of gate 93B are connected to the $\overline{Q}$ output of flip-flop 90C and to the DEC conductor, respectively. One input of exclusive NOR gate 91C is connected to the Q output of flip-flop 90C, the other input being connected to the output of NOR gate 94. The two inputs of NOR gate 94 are connected to the INC and DEC conductors, respectively. As shown in FIG. 5, the outputs of INC/DEC logic circuit 43 produced by the inverting outputs of exclusive NOR gates 91A, 91B, and 91C are inverted by inverters 44A, 44B, and 44C, respectively. The output of inverter 44A is connected to inputs of inverting buffer 57A and to the input of gated inverter 58A. The output of inverter 44B is connected to the input of inverting buffer 57B and to the input of gated inverter 58B. The output of inverting buffer 44C is connected to the input of inverting buffer 57C and to the input of gated inverter 58C. The outputs of gated inverters 58A, 58B, and 58C produce the extended address bus signals XAB18, XAB17, and XAB16 on conductors 59A, 59B, and 59C, respectively. Inverters 57A, 57B, and 57C produce the extended address signals A18, A17, and A16 on conductors 7A, 7B, and 7C, respectively. A signal $\overline{ENCURXA}$ (Enable Current Extended Address) produced by sequencer 26 is applied to the enable inputs of gated inverters 58A-C.

Figure 6:
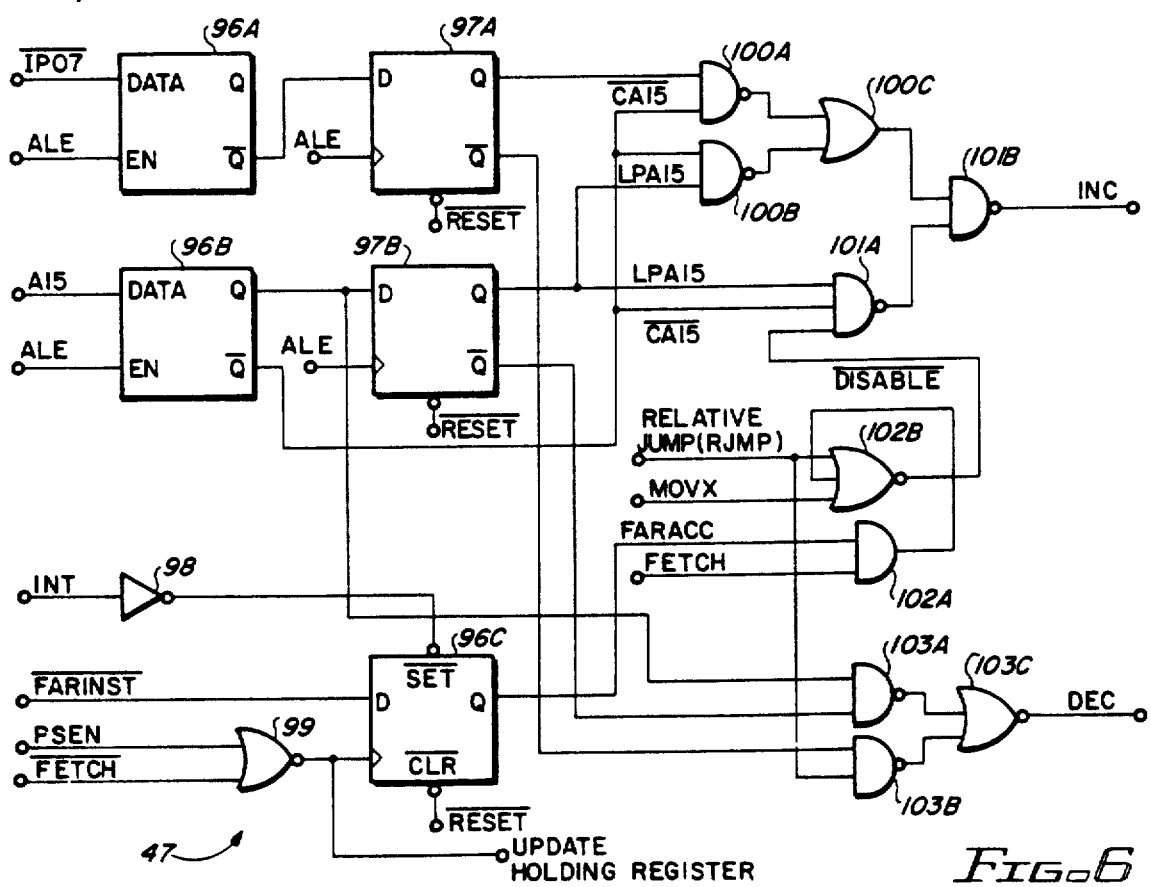
FIG. 6 is a detailed block diagram of the incrementer/decrementer control logic in block 47 of FIG. 2.

FIG. 6 shows the details of increment/decrement control logic 47 of FIG. 2. This circuit includes latches 96A and 96B having their data inputs connected to receive the signals $\overline{IP07}$ and A15, respectively. Both are enabled by ALE. The $\overline{Q}$ output of latch 96A is connected to the D input of D type flip-flop 97A. The Q output of flip-flop 96B is connected to the D input of D type flip-flop 97B. Flip-flops 97A and 97B both are clocked by ALE. The Q output of flip-flop 97A is connected to one input of NAND gate 100A, the output of which is connected to one input of OR gate 100C. The output of OR gate 100C is connected to one input of NAND gate 101B, which produces the increment signal $\overline{INC}$.

The $\overline{Q}$ output of flip-flop 97A is connected to one input of NAND gate 103B, the output of which is connected to two input NOR gate 103C, which produces the signal DEC. The Q output of the other flip-flop 97B is connected to one input of NAND gate 100B, the output of which is connected to input of OR gate 100C. The Q output of flip-flop 97B is also connected to one input of NAND gate 101A, the output of which is connected to the other input of NAND gate 101B. The $\overline{Q}$ output of flip-flop 97B is connected to one input of NAND gate 103A. The output of NAND gate 103A is connected to the other input of NOR gate 103C. The $\overline{Q}$ output of latch 96B is connected to one input of each of gates 100A, 100B, and 101A.

The third input of gate 101A is connected to the output of a NOR gate 102B to receive the DISABLE signal, one input of NOR gate 102B is connected to receive a RELATIVE JUMP (RJMP) signal from decoder 22 which is also applied to one input of gate 103B. Another input of NOR gate 102B is connected to an output of two input AND gate 102A, one input of which is connected to the Q output of a D type flip-flop 96C which produces a signal FARACC (far access). The other input of NAND gate 102A receives the FETCH signal from sequencer 26. The third input of gate 101B receives a MOVX signal from sequencer 26.

The D input of flip-flop 96C receives the signal $\overline{FA\ RINST}$. The $\overline{SET}$ input of flip-flop 96C is connected to the output of inverter 98, the input of which receives the interrupt signal INT. The clock input of flip-flop 96C is connected to the output of a two input NOR gate 99, which receives the PSEN and $\overline{FETCH}$ signals, to produce an UPDATE HOLDING REGISTER signal.

Now that the structure of the program memory expander and 8051-based microcontroller system have been described, and before explaining the operation of that system, it will be helpful to review the previously described instructions for which conventional memory bank switching techniques cause the above-mentioned problems if program memory space of greater than 64 kilobytes is used.

FIG. 1A shows the format of a conventional AJMP instruction, which is a 2 byte instruction that allows the program to jump anywhere within a 2 kilobyte page, and is directly executable by the 8051 microcontroller. It is a 2 byte instruction with 3 bits of the address residing in the op code byte. When the 8051 microcontroller recognizes the op code of a conventional AJMP instruction, it enters the appended address byte of the AJMP instruction in the least significant byte of the 16 bit program counter of the 8051 microcontroller, and enters the 3 bits of embedded address from the op code byte in the next three significant bits of the program counter, thereby producing an 11 bit address in the program counter.

The LJMP instruction is a 3 byte instruction that allows the program to jump anywhere within a 64 kilobyte block of memory, and is directly executable by 8051 microcontroller 2.

The FJMP (far jump) instruction is an instruction which is stored in 512 kilobyte program memory 6 of FIG. 1, and is not directly executable by an 8051 microcontroller. However, in accordance with the present invention, the FJMP instruction is transformed by program memory expander chip 5 into an LJMP instruction which is directly executed by 8051 microcontroller 2.

The ACALL instruction is a 2 byte instruction that allows the programmer to jump anywhere in a 2 kilobyte page, and is directly executable by 8051 microcontroller 2.

The LCALL instruction is a 3 byte instruction that allows the program to jump anywhere any 64 kilobyte block of memory, and is directly executable by 8051 microcontroller 2.

An FCALL instruction can be stored in program memory 6 of FIG. 1, and is not directly executable by an 8051 microcontroller. However, in accordance with the present invention, the FCALL instruction is transformed by the program memory expander chip 5 to an LCALL instruction which is directly executed by 8051 microcontroller 2.

Thus, both the FJMP instruction and the FCALL instruction are capable of being stored in a 512 kilobyte program memory 6 and, in effect, being executed by the 8051 microcontroller, using the principles of the present invention.

Figure 1B:
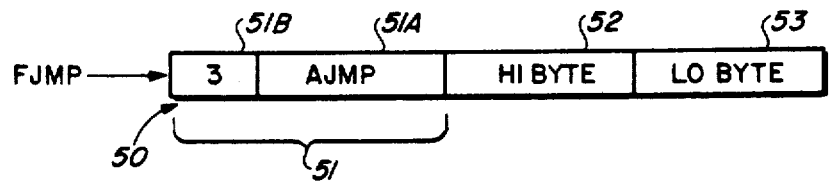
FIG. 1B shows a so-called FJMP instruction that is recognized by the program memory expander of the present invention.

FIG. 1B shows the format of the three word FJMP instruction 50, which is not executable by 8051 microcontroller chip 2. The FJMP instruction is executed to jump from one part of program memory 6 to another when the jump is greater than 64 kilobytes. The FJMP instruction is constructed by using the AJMP op code followed by a full 16 bit target address including a "high byte" 52 and a "low byte" 53. The three embedded address bits of the AJMP op code are used to determine the 3 high order address bits A16-A18 of the extended 19 bit address produced by the present invention. FJMP instruction 50 includes first, second, and third bytes 51, 52, and 53.

Figure 1C:
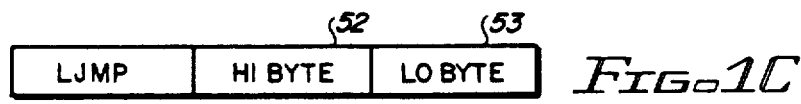
FIG. 1C shows the format of a standard LJMP instruction that is executable by an 8051 microcontroller.

The basic operation of the system of FIG. 1 is that for an FJMP instruction stored in program memory 6, PME 5 transforms the FJMP op code 51A (which itself would be recognized as an AJMP op code) into an 8-bit LJMP (long jump) op code of an LJMP instruction, the format of which is indicated in FIG. 1C. The 8051 microcontroller then executes the LJMP instruction (which has 16 target address bits), rather than the AJMP op code that was fetched from program memory 6 as part of the FJMP instruction.

PME 5 also loads the 3 bits of embedded address 51B from the op code byte into holding register 55 (FIG. 2). At the end of execution of the LJMP instruction, the contents of holding register 55 are loaded into extended address register (XAR) 42 contained in PME 5, as shown in FIG. 2. It should be noted that the capability of jumping within a 2048 byte page now is lost, but the capability is not nearly as important as being able to jump within 512 kilobytes of program memory independently of the 64 kilobyte boundaries 61.

Figure 3:
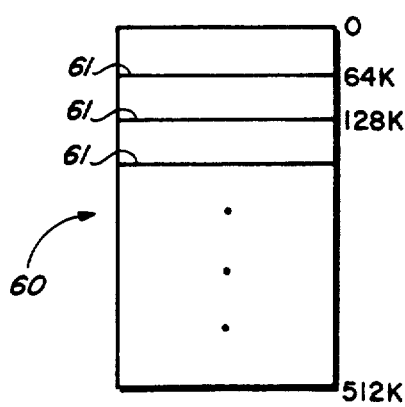
FIG. 3 is a diagram of a 512 kilobyte program memory space with 64 kilobyte boundaries.

The contents of XAR 42 are output as extended address bits A16-A18 after being suitably incremented, decremented, reset, or not operated upon at all, depending on the instruction being executed. The three extended address bits A16-A18 then can be utilized in conjunction with address bits A0-A15 to address program memory 6 independently of 64 kilobyte boundaries 61 of FIG. 3.

In operation, PME 5 recognizes the AJMP op code 51A of the FJMP instruction 50 appearing on the 512 kilobyte program memory data bus 3A by decoding four of the five least significant bits of the op code as 00001, converts it to an LJMP op code, which causes the 8051 to enter both bytes 52 and 53 (FIG. 1C) into the 16 bit program counter of the 8051, and enters the 3 most significant bits of that op code into extended address register 42 via holding register 55 of FIG. 2. After suitable incrementing, decrementing, or no operation, the three extended address bits A16-A18 are output as part of the extended 19 bit program memory address, allowing the 8051-based microcontroller to access all 512 kilobytes of program memory 6 without regard for 64 kilobyte address space boundaries 61.

It should be appreciated that the 8051 can only use one address byte in response to decoding of the 5 bit op code. If program memory expander 5 determines that the 4 least significant bits of the 5 bit instruction op code are 0001, program memory expander 5 then determines that the present op code is either an AJMP or a ACALL op code, and forces four of the bits to change so that the 8051-based microcontroller cannot operate on the instruction.

The "AJMP/ACALL detect" portion of circuit 30 of FIG. 2 detects the presence of an AJMP op code and the "LJMP/LCALL force" portion of circuit 30 forces the bits to an LJMP op code. The detect portion of circuit 30 responds to D0-D3 to produce the FARINST signal and forces changes in some of the bits BD0, BD1, BD5, BD6, BD7, applied to the output drivers that go to 8051-based microcontroller 2.

Program memory addresses usually are incremented or decremented. Since part of the 19-bit virtual program counter is in the 16-bit program counter of the 8051-based microcontroller 2 and the other part is in extended address register 42, increment/decrement logic 43 and increment/decrement control logic 47 in FIG. 2 must cooperate with corresponding increment/decrement circuitry in microcontroller 2 to effectuate proper incrementing or decrementing of the extended addresses. XAR 42 is loaded at the time of the leading edge of the ALE signal produced by the 8051-based microcontroller; that leading edge signals the beginning of a bus cycle. Holding register 55 is loaded into XAR 42 in response to a select signal produced by the INC/DEC controlled logic 47. The output of XAR 42 is applied to increment/decrement logic 43.

The above description of execution of an FJMP instruction also applies to execution of an FCALL instruction. More specifically, the op code of an FCALL instruction is an ACALL op code that is detected by the AJMP/ACALL detect portion of circuit 30; an LCALL op code then is forced by the force portion of circuit 30 and sent to 8051 microcontroller 2 to be executed.

In the case of a call or interrupt (note that the 8051 microcontroller services an interrupt request by internally executing an LCALL instruction), it is necessary to save the contents of the program counter on the stack. The contents of the program counter of 8051 microcontroller 2 is stored in the internal stack of the 8051, and the contents of XAR 42 are stored in extended address stack 44 of FIG. 2. This may occur after incrementing or decrementing of the contents of the program counter and/or XAR 42 has occurred, so in FIG. 2, the output of INC/DEC logic circuit 43 is connected through gated inverters 58A-C to the data terminals of the extended address stack 44 so that the incremented or decremented extended address bits can be stored in the extended address stack 44. In the case of a return from call (RET) instruction or a return from interrupt (RETI) instruction, the output of extended address stack 44 is reloaded into XAR 42 via extended address bus conductors 59.

To summarize the general operation, in the case of a FJMP instruction, the contents of holding register 55 are transferred via multiplexer 41 to extended address register 42. In the case of an FCALL instruction, an interrupt, or an LCALL instruction, the output of incrementer/decrementer logic 43 is transferred via extended address bus 59 to extended stack 44, and the contents of holding register 55 are transferred via other conductors of extended address bus 59 through multiplexer 41 into XAR 42. In the case of a return from call (RET) or return from interrupt (RETI) instruction, the contents of extended stack 44 are transferred via extended address bus 59 into XAR 42. In all other cases, the contents of increment/decrement logic 43 are transferred by the extended address bus 59 to XAR 42.

The P0-0 through P0-7 input/output port conductors 3 (FIG. 2) are connected to the input of a programmed logic array (PLA) decoder 22, which produces RJMP, CALL, and RET signals.

Interrupt detect circuit 25 generates the INT signal on conductor 24 and in response thereto, sequencing logic 26 produces the FETCH signal 26A and keeps PME 5 synchronized with the 8051 microcontroller 2. Instruction register (IR) 21 is similar to the one in the 8051 microcontroller 2.

The INT (interrupt), CALL, and RET (return from call) signals are applied to logic circuit 46 which generates the above-mentioned INC signal and DEC signal and applies them to Stack Pointer circuit 45. Stack control circuit 46 performs the function of "pushing" extended address values to extended address stack 44 from XAB conductor 59. Stack control circuit 46 also performs the function of "popping" extended address values from extended address stack 44 to one group of three inputs of multiplexer 41. The other group of three inputs of multiplexer 41 is coupled to internal data connectors, ID5', ID6', and ID7' from holding register 55. The outputs of multiplexer 41 are loaded into XAR 42, the outputs of which are input to INC/DEC logic circuit 43. INC/DEC logic circuit 43 increments, decrements, or passes through unchanged the present contents of extended address register 42, depending on the levels produced on conductors 48A and 48B by logic circuit 47. The outputs of INC/DEC circuit 43 are coupled through gated inverters 58A-C to the three data terminals of extended address stack RAM 44, and also are coupled through buffers 57 to produce the extended address signals A16-A18 on conductors 7.

The main data flow of the circuit of FIG. 2 occurs through circuitry 30A, shown in detail in FIG. 4. Gates 74 and 75 of FIG. 4 function to detect the AJMP instruction and ACALL instruction. Multiplexers 76 and 77 perform the function of "forcing" the states representing the LJMP instruction and the LCALL instruction onto the P0 lines. If the present data read is the first one of an instruction, the data coming in from the $D_0-D_3$ leads is decoded by gates 74 and 75. If a bit pattern representing either an AJMP or an ACALL instruction is detected by gates 74 and 75, the signal FARINST (far instruction) appears on conductor 40. This causes multiplexers 76 and 77 to select their respective "B" inputs, in which case the AJMP bit pattern of XXX00001 (X represents the above-mentioned embedded address bits) is converted to the LJMP bit pattern of 00000010. That is output on Port 0 and read by 8051 microcontroller 2. Thus, 512 kilobyte program memory 6 supplies an AJMP instruction. Circuit 30A of FIG. 4 produces and outputs an LJMP instruction to the 8051 microcontroller which it can execute.

The FARINST signal is asserted only during an AJMP or an ACALL instruction. At all other times, the 5 bit multiplexer consisting of multiplexers 76 and 77 selects the "A" inputs of the 5 bit multiplexer, and the data from the D0-D7 bus 3A passes through to the corresponding Port 0 bus designated by numeral 3.

The detailed operation of increment/decrement circuit 47 is described with reference to FIG. 6. In the course of operation, it is necessary to determine when the 8051 program memory counter overflows. As previously mentioned, that condition is detected by determining the condition that the most significant bit of the program counter undergoes a transition from a "1" to a "0". Latch 96B, flip-flop 97B, and gate 101A cooperate to detect this condition. The "current" most significant bit of the program counter is latched in latch 96B. Flip-flop 97B stores the most significant bit of the program counter for the previous bus cycle. When the current value is a "0" and the previous cycles value of the most significant bit of the program counter is a "1", the above transition has occurred, and gate 101A forces an INC signal out of gate 101B. The circuitry associated with NOR gate 102B disables the increment circuitry under certain conditions.

There may be conditions in which there appears to be an overflow from the program counter, but actually no overflow has occurred. Three cases in which this can happen include, first, execution of a relative jump instruction, in which case there is a different circuit that detects whether the program counter overflows. That condition is dealt with by gates 100A and 100B. Second, if a FARACC operation has been performed, the increment circuitry should be disabled for the fetch cycle of the subsequent instruction, because the program counter has been reloaded, and the most significant bit may have a value that may be improperly decoded as an overflow. A "FARACC" instruction simply indicates the decoding of an AJMP or an ACALL instruction. FARACC is the latched value of FARINST, and stays high for the entire instruction cycle, i.e., for four bus cycles. The third case in which the INC/DEC circuit 43 is to be inhibited is during the execution of a MOVX instruction, which refers to a data fetch, rather than an instruction fetch. The most significant bit of the address may change from a "1" to a "0" during a MOVX execution cycle, and the program counter should not be incremented at that time.

Gates 100A, 100B, gates 103A, and 103B all pertain to the relative jump instruction. In a relative jump instruction, it may be necessary to either increment or decrement the program counter of the 8051 microcontroller 2, because a 64 kilobyte boundary may be "straddled". Gates 100A and 100B decode the condition where there is a forward jump across the 64 kilobyte boundary 61 of FIG. 3.

If a relative jump instruction causes microcontroller 2 to jump either forward or backward over a 64 kilobyte boundary 61, the embedded address needs to be updated accordingly. If the relative jump instruction causes microcontroller 2 to jump forward to a higher address over a 64 kilobyte boundary 61, it is necessary to detect overflow out of the most significant bit of the microcontroller program counter. This is accomplished by observing both the most significant bit of the low byte of the program counter and the most significant bit of the high order byte of the program counter. If the most significant bit of the low byte is a "1", that is the only case in which you can have overflow across a 64 kilobyte boundary. If that bit is a "0", overflow cannot occur since the maximum forward access is 127 addresses. If at the same time the most significant bit of the program counter previously was a "1", and it goes to a "0", for the current bus cycle then there is an overflow out of the most significant byte of the program counter.

If this is the case, then it is necessary to increment the extended address. Gates 100A, 100B, and 100C detect this condition and generate the increment signal INC if necessary. Gate 100A detects that the previous most significant bit of the lower byte was a "1", and the most significant bit of the upper byte is a "0". Gate 100B detects the condition of an overflow from the most significant byte of the program counter. Gate 100B detects the condition where the last value of the most significant bit of the program counter is a "1" and the current value of that bit is a "0", indicating a "1" to "0" transition. If both of these conditions are met, gates 100A and 100B output "0"s, which causes gate 100C to output a "0" that enables the INC signal to occur.

Another condition occurs if the program counter jumps backward over a 64 kilobyte boundary. Then underflow out of the low byte of the program counter propagates to the upper byte of the program counter, producing underflow out of the most significant byte of the program counter. This leads to the need to decrement the contents of the extended address register 43. Gates 103A and 103B detect that condition. Gate 103A detects that an underflow condition is possible because the present instruction is a relative jump and that the previous most significant bit of the lower byte of program counter is a "0". Gate 103A detects whether an underflow actually occurs by detecting that the most significant bit of the upper byte of the program counter makes the transition from a "0" to a "1". Gate 103A detects that the last most significant bit of the program counter was a "0" and the current value is a "1", indicating the "0" to "1" transition. This condition produces the DEC signal.

Referring to FIG. 5, the extended address bits XAB16, XAB17, and XAB18 are clocked by ALE into extended address register 42, which includes three D type flip-flops. Depending upon whether the INC or DEC signals are present, the extended address at the outputs of extended address register 42 is incremented, decremented, or not changed before being output to extended address bus 59. One skilled in the art can readily see that if neither INC or DEC is a "1", the outputs of extended address register 42 simply pass unchanged through to extended address bus 59. If INC is equal to a "1", the signal levels appearing on extended address bus 59 are incremented, and if DEC is equal to a "1", the levels on extended address bus 59 are decremented.

The above-described invention allows the programmer to achieve "rollover" from one 64 kilobyte block to another during incrementing or decrementing operations, with forward and backward "relative jumps" across addressing boundaries between such blocks. The described embodiment of the invention can handle interrupts, allowing storing of any program address on the stack in response to an interrupt. This capability allows returning from an interrupt to the last program memory location anywhere in the program memory. These operations can be achieved without any concern for 64 kilobyte boundaries in the program memory.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention.

What is claimed is:

1. An 8051-based microcontroller system comprising:
   (a) an 8051 microcontroller which is capable of directly addressing only a first number of address locations, and which allows a program to jump anywhere within a second number of address locations using an address portion of an instruction op code;
   (b) a program memory having substantially more than the first number of address locations;
   (c) a program memory expander including
      i. means for detecting an op code received from the program memory, the op code containing a plurality of address bits,
      ii. means for transferring a number of the address bits contained in the op code into an extended address register in response to the detecting,
      iii. means for forcing predetermined states onto a multiplexed address/data bus in response to the detecting of the op code to prevent the 8051 microcontroller to instead recognize a different op code,
      iv. incrementing/decrementing means for incrementing or decrementing the contents of the extended address register in conjunction with incrementing or decrementing by the 8051 microcontroller of its program counter, and
      v. means for applying outputs of the incrementing/decrementing means to address inputs of the program memory.

2. The 8051-based microcontroller system of claim 1 further including an external stack and an extended address bus coupling the outputs of the incrementing/decrementing means to inputs of the extended address register to effectuate pushing of extended address bits into a stack in response to an interrupt or call instruction and to effectuate popping of extended address bits from the stack in response to a return instruction.

3. The 8051-based microcontroller system of claim 1 wherein the first number of address locations is 65,536, the second number of address locations is 2048, the address portion of the instruction op code includes 3 bits, the program counter is a 16-bit program counter, the 16-bit program counter being concatenated with the extended address register to provide a 19 bit virtual program counter which is directly loadable from a program being executed by the 8051 microcontroller, whereby the 8051-based microcontroller system can directly jump to any address of a 524,288 location program memory address space.

4. The 8051-based microcontroller system of claim 3 including means for synchronizing loading of the virtual program counter to reading of an op code of an instruction during an execution cycle of the microcontroller, whereby the 8051-based microcontroller system can directly jump to any address of a 524,288 location program memory address space.

5. The 8051-based microcontroller system of claim 1 wherein the detecting means detects an AJMP (absolute jump) op code in an FJMP (far jump) instruction received from the program memory and the forcing means sends an LJMP (long jump) op code via the address/data bus to the 8051 microcontroller, whereby the 8051-based microcontroller system can directly call a subroutine anywhere in a 524,288 location program memory.

6. The 8051-based microcontroller system of claim 5 wherein the detecting means detects an ACALL (absolute call) op code in an FCALL (far call) instruction received from the program memory and the forcing means sends an LCALL (long call) op code via the address/data bus to the 8051 microcontroller.

7. The 8051-based microcontroller system of claim 1 including means for detecting whether a program counter of the 8051 microcontroller has overflowed and causing the incrementing/decrementing means to increment the extended address register in response to the overflow of the program counter.

8. The 8051-based microcontroller system of claim 7 including means for detecting whether the program counter has underflowed and causing the incrementing/decrementing means to decrement the extended address register in response to the underflow of the program counter.

9. A method of operating an 8051-based microcontroller system to access more than 64 kilobytes of program memory address space independently of 64 kilobyte boundaries therein, comprising the steps of:
   (a) operating an 8051 microcontroller to produce a first address and latching the first address in a program memory expander;
   (b) sending an FJMP (far jump) instruction from a first address location of a program memory to the program memory expander, the FJMP (far jump) instruction including an op codes of an AJMP (absolute jump) instruction, the op code of the AJMP (absolute jump) instruction including three embedded address bits;

(c) detecting the AJMP (absolute jump) op code of the FJMP (far jump) instruction during an instruction cycle of the 8051 microcontroller;

(d) entering the three embedded address bits of the AJMP (absolute jump) op code into a holding register;

(e) generating an LJMP (long jump) op code in response to the detecting of the AJMP (absolute jump) op code, sending the LJMP (long jump) op code to the 8051 microcontroller, and operating the 8051 microcontroller to execute the LJMP (long jump) op code;

(f) operating the program memory expander to detect the beginning of a new instruction cycle and then transferring the three embedded address bits into an extended address register;

(g) using the three embedded address bits in the extended address register as the three most significant bits of a 19-bit target address, the least significant 16 bits of which are equal to the contents of a program counter of the 8051 microcontroller; and (h) outputting the 19-bit target address to the program memory to access another address location of the program memory.

10. The method of claim 9 including incrementing the extended address register before step (h) to thereby increment the 19-bit target address across a 64 kilobyte boundary of the program memory address space.

11. The method of claim 9 wherein the incrementing is performed in response to detecting an overflow condition in the program counter of the 8051 microcontroller.

12. The method of claim 9 including decrementing the extended address register before step (h) to thereby decrement the 19-bit target address across a 64 kilobyte boundary of the program memory 19-bit address space.

13. The method of claim 12 wherein the decrementing is performed in response to detecting an underflow condition in the program counter of the 8051 microcontroller.

14. The method of claim 9 wherein the FJMP (far jump) instruction includes a plurality of bytes in addition to the AJMP (absolute jump) op code, and wherein step (e) includes sending the plurality of bytes to the 8051 microcontroller and operating the 8051 microcontroller to execute those bytes in conjunction with executing the LJMP (long jump) op code.

15. A method of operating an 8051-based microcontroller system to access more than 64 kilobytes of program memory address space independently of 64 kilobyte boundaries therein, comprising the steps of:

(a) operating an 8051 microcontroller to produce a first address and latching the first address in a program memory expander;

(b) sending an FCALL (far call) instruction from a first address location of the program memory to the program memory expander, the FCALL (far call) instruction including an op code of an ACALL (absolute call) instruction, the op code of the ACALL (absolute call) instruction including three embedded address bits;

(c) detecting the ACALL (absolute call) op code of the FCALL (far call) instruction during an instruction cycle of the 8051 microcontroller;

(d) entering the three embedded address bits of the ACALL op code into a holding register;

(e) generating an LCALL (long call) op code in response to the detecting of the ACALL (absolute call) op code, sending the LCALL (long call) op code to the 8051 microcontroller, and operating the 8051 microcontroller to execute the LCALL (long call) op code;

(f) storing the contents of an extended address register in a stack memory;

(g) operating the program memory expander to detect the beginning of a new instruction cycle and then transferring the three embedded address bits into the extended address register;

(h) using the three embedded address bits in the extended address register as the three most significant bits of a 19-bit target address, the least significant 16 bits of which are equal to the contents of a program counter of the 8051 microcontroller; and (i) outputting the 19-bit target address to the program memory to access another address location of the program memory.

16. A method of operating an 8051-based microcontroller system to access more than 64 kilobytes of program memory address space independently of 64 kilobyte boundaries therein, comprising the steps of:

(a) operating an 8051 microcontroller to produce a first address of an op code of an instruction during a first program memory bus cycle and latching a portion of the first address in a program memory expander;

(b) operating the 8051 microcontroller to produce a second address during a second program memory bus cycle and latching a portion of the second address in the program memory expander;

(c) comparing the portions of the first and second addresses and, if they are equal, generating an internal interrupt signal indicating the occurrence of an interrupt cycle;

(d) storing the contents of an extended address register in a stack memory;

(e) operating the program memory expander to detect the beginning of a new instruction cycle and then resetting the extended address register to zero;

(f) using the reset contents of the extended address register as the three most significant bits of a 19-bit target address, the least significant 16 bits of which are equal to the contents of a program counter of the 8051 microcontroller; and (g) outputting the 19-bit target address to a program memory to access another address location of the program memory.

17. A method of operating an 8051-based microcontroller system to access more than 64 kilobytes of program memory address space independently of 64 kilobyte boundaries therein, comprising the steps of:

(a) operating an 8051 microcontroller to produces a first address and latching the first address in a program memory expander;

(b) sending a return instruction from a first address location of a program memory to the program memory expander;

(c) transferring the contents of a location of a stack memory into a holding register;

(d) operating the program memory expander to detect the beginning of a new instruction cycle and then transferring the contents of the holding register into the extended address register;

(e) using the contents of the extended address register as the three most significant bits of a 19-bit target address, the least significant 16 bits of which are equal to the contents of a program counter of the 8051 microcontroller; and (f) outputting the 19-bit target address to the program memory to access another address location of the program memory.

* * * * *